Figure 1:
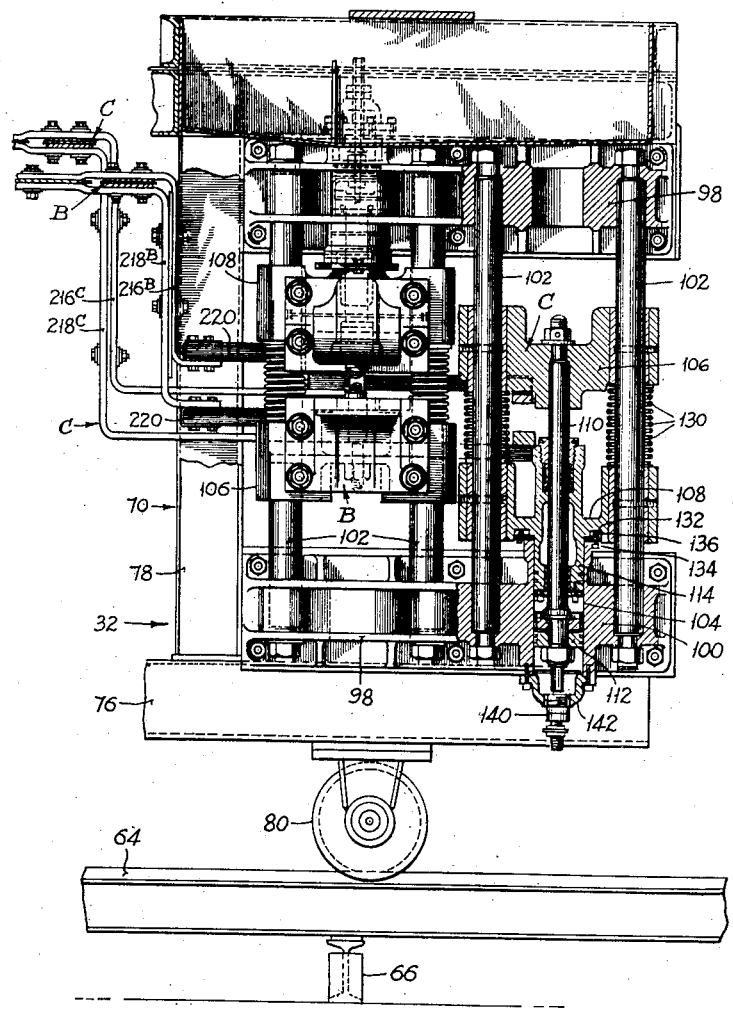

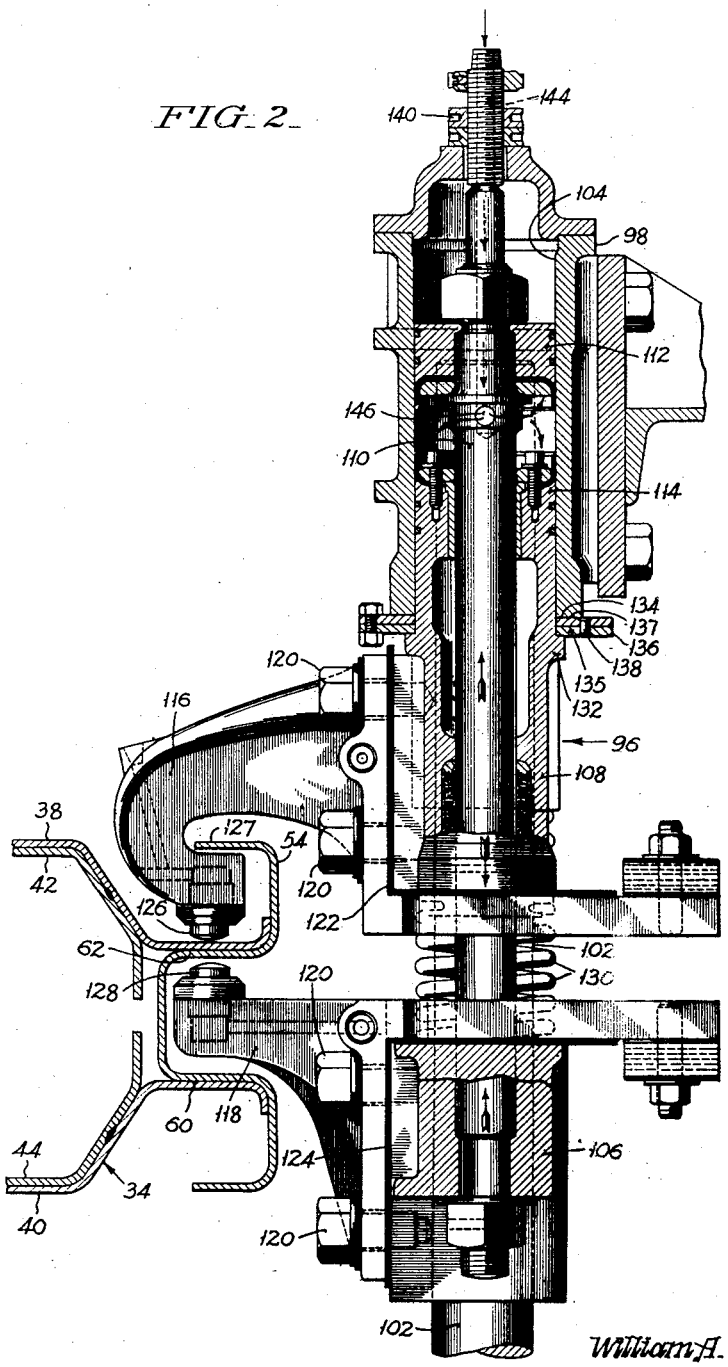

Patented Mar. 27, 1945

2,372,413

UNITED STATES PATENT OFFICE 2,372,413

WELDING GUN

William A. Weightman, Philadelphia, Pa., assignor to Edw. G. Budd Manufacturing Company, Philadelphia, Pa., a corporation of Pennsylvania Original application August 1, 1940, Serial No. 349,308. Divided and this application March 3, 1943, Serial No. 477,805

11 Claims. (Cl. 219—4)

This invention relates to welding apparatus and more particularly to a welding gun for effecting a plurality of spot welds along the length of a beam or like member.

This application is a division of my co-pending application Serial Number 349,308, filed August 1, 1940.

An object of the invention is to provide a welding gun structure of substantial rigidity. A further object is to provide a welding gun adapted for the securing of heavy welds. An object also is to provide a welding gun with a satisfactory floating mounting for the same.

The above and other objects of the invention are effectuated by the apparatus and mechanism detailed in the following description in conjunction with the accompanying drawings. It is expressly understood, however, that the description and drawings are employed for purposes of illustration only and are not designed as a definition of the limits of the invention, reference being had for this purpose to the appended claims.

Referring to the drawings in which like reference characters indicate like parts throughout.

Figure 1 is an enlarged side elevation of a pair of vertical welding guns, one being illustrated in section along its vertical axis: and Figure 2 is a longitudinal section through one of the welding guns illustrated in Figure 1, the section being taken axially through the cylinder and at right angles to the plane of the support of the gun.

Referring to Figure 1 and also Figure 2 wherein the general arrangement of the apparatus is shown, there will appear a track 64 having a carriage 32 thereon adapted to operate upon a workpiece 34 such as an extended column or beam, the latter being supported upon the spaced support arms arranged along the length of the track. Taking into consideration the particular beam to be operated upon as illustrated in conjunction with Figure 2, it will appear that the various component parts of the beam are to be secured together at certain points and preferably at uniformly spaced intervals along their length. For example the center sill or column structure illustrated is composed of top and bottom members 38 and 40 which have been channelled in the manner illustrated by drawing through a suitable draw bench. The top and bottom members 38 and 40 are centrally reinforced by inner reinforcing channel members 42 and 44. Initially before the final assembly of the various component parts of the sill, the reinforcing members 42 and 44 are secured to the top and bottom members 38 and 40 in two separate operations involving the effecting of a plurality of welds, the welds being adapted to secure the adjacent channel faces of the reinforcing members 42 and 44 to the respective faces of the adjacent top and bottom channel members 38 and 40. Side members 54 also of channel cross section are in a later stage assembled together with top and bottom members and fixed through welds securing the side members 54 to the top and bottom members 38 and 40 along the portions of one another that are in face to face or lap contact. In a center sill for railway use, for example, the particular channel members referred to may be rolled from as heavy strip stock as quarter-inch high tensile stainless steel and the individual welds securing two such members together are, therefore, effected through a pair of channel members, the total thickness of which may be as great as a half-inch. Thus such spot welds are of unusual size.

In order to support the carriage 32 and the beam 34 in operative relation with respect to one another, the carriage 32 is adapted to roll upon rails 64 carried upon transverse ties 66.

The carriage 32 as illustrated in Figure 1 is generally constructed of spaced side frames 70 connected together across the top thereof by a bridge or top framework member. Each side frame is composed of a lower sill 76 and one or more spaced uprights such as 78 spaced along the length thereof at convenient points. The sill 76 is provided with flanged wheels 80 which in turn roll upon the track 64 and are adapted to maintain the carriage aligned along the track with respect to the beam 34 throughout its operations thereupon as it traverses the beam 34 and track from one end to the other.

To effect the vertical welds 60 and 62 between the channel members 38 and 40 and 54 of the center sill, the welding guns 96 are positioned on the inside of the side members 70 of the carriage. Such welding guns are supported from the side members at the top and bottom through identical top and bottom castings 98 and 100. As is illustrated, for example in Figure 1, two welding guns are supported upon each side of the carriage, one gun B being adapted to effect welds as indicated at 62 and the other, C, being adapted to effect welds as indicated at 60. Each of the guns is identical but the gun for effecting the welds 62 is inverted with respect to the gun which effects the welds 60. The end support castings 98 and 100 are also reversed with respect to one another as will hereinafter appear.

In order to effect the heavy welds contemplated it is necessary to apply heavy pressures to the welding electrodes and since the welding electrodes must overhang to a considerable extent to reach into the contour of the channel members of the beam to be welded, provision must be made to mechanically resist such torsion and other eccentric stresses which would be set up in each welding gun. Accordingly, as will be seen in Figure 1, each welding gun is carried upon a pair of spaced heavy guide rods 102 extending between the cast end supports 98 and 100. As is shown in section in Figure 1 the lower cast end piece 100 is provided with a cylinder bore 104 integral therein and having an axis lying in substantially the same plane as that common to the axes of the rods 102. Slidably arranged upon the rods 102 are welding electrode carrier guide blocks 106 and 108, the former being provided with a piston rod 110 extending through the latter into the cylinder 104 wherein it is provided with a piston 112. The other block 108 through which the piston rod 110 passes is provided with an integral extension portion 114 forming a piston head likewise reciprocating within the cylinder 104.

The electrode carrying blocks 106 and 108 (see Figure 2) are provided with electrode carrying brackets 116 and 118 secured to the blocks through bolts 120, there being provided layers of insulation 122 and 124 between the brackets and bolts and their respective blocks. The bracket 116 is provided with a goose neck at the end thereof to support a welding electrode tip 126 in such a way as not to interfere with the flange 127 of the channel member 54. The lower electrode bracket is provided with an opposed electrode tip 128, the electrode tips 126 and 128 being adapted to engage the channel members 54 and 38 to effect a weld at the point 62 (see Fig. 2).

It will be seen that the electrode carrying blocks 106 and 108 are both slidable upon the rods 102 and carry the piston head 114 and the piston 112 within the cylinder bore 104. Thus, upon an introduction of fluid pressure within the cylinder bore 104 and between the piston 112 and piston head 114, the blocks 106 and 108 will be moved toward one another thereby engaging the welding tips 126 and 128 with the work. To assure positive separation of the welding electrodes after release of fluid pressure from the cylinder 104, coil springs 130 coaxially arranged upon the rods 102 and between the slidable blocks 106 and 108 which are adapted to cause the blocks to separate are provided. In order to restrict the extent of the separation of the welding electrodes upon the completion of a weld and so as to prevent the electrode tips from separating sufficiently to come in contact with the adjacent side walls or flanges, for example the flange 127 of the channel member 54 (see Fig. 2), a shoulder 132 concentric around the piston 114 is adapted to engage the end of the cylinder bore 104 as at 134, through one or more adjustment collars 136. The adjustment collars are removable since each collar is composed of two substantially semi-circular parts 135 and 137 hinged together as at 138. Thus, downward (see Fig. 1) or upward (see Fig. 2) movement of the block 108 and its electrode is adjustably limited. Movement of the block 106 as a result of the pressure of the springs 130 is limited by the adjustable threaded collars 140 arranged upon the extension of the piston rod 110, the collars being adapted to abut a bell-shaped end enclosure 142 of the cylinder 104. It will readily appear that the collars 136 and 140 are effective to limit the separation of the welding electrodes regardless of whether the welding gun be positioned as illustrated in the right-hand portion of Figure 1, or inverted as in the left-hand portion of Figure 1, or, for example, as illustrated in Figure 2.

Engagement of the welding electrodes with the work is accomplished by introducing fluid under pressure to the space between the pistons 112 and 114 through the bore 144 extending through the center of the piston rod 110, which bore terminates in a transverse aperture 146 leading into the space between the pistons. Thus, by introducing fluid under pressure through the hollow piston rod, the piston and piston head may be forced to spread thereby causing the welding electrodes to engage the work under pressure.

Connections to the welding guns 96 are completed through bars 216 and 218 and flexible jumpers 220 completing connection to the lugs 116 and 118 of each of the welding guns. Each of the bus bars 216 and 218 has a horizontal portion connected to the power source, an intermediate vertical portion and a horizontal portion to which the gun jumpers 220 are connected.

Though only a single form of the invention particularly applicable to the beam shown, is illustrated and described the invention is not limited thereto but may be embodied in various forms as desired. As various changes in construction and arrangement of parts may be made without separating from the spirit of the invention as will be apparent to those skilled in the art, reference will be had to the appended claims for a definition of the limits of the invention.

What is claimed is:

1. In a welding gun, a pair of spaced supports, guide rods extending between supports, a cylinder mounted on one of said supports, having an axis parallel with said rods, electrode carrying members slidably arranged on said guide rods, a pair of pistons in said cylinder, and means for connecting said pistons to said members to provide for relative movement therebetween upon relative movement between said pistons.

2. In a welding gun, a pair of spaced supports, parallel guide rods extending between supports, a cylinder mounted on one of said supports, having an axis parallel with said rods, electrode carrying members slidably arranged on said guide rods, a pair of pistons in said cylinder, a sleeve connecting one of said pistons with one of said members, and a piston rod extending thru said sleeve and said one of said pistons and connected to the other piston and other member.

3. In a welding gun, a pair of spaced supports, parallel guide rods extending between supports, a cylinder mounted on one of said supports, having an axis parallel with said rods, electrode carrying members slidably arranged on said guide rods, a pair of pistons in said cylinder, a sleeve connecting one of said pistons with one of said members and a piston rod extending thru said sleeve and said one of said pistons and connected to the other piston and other member, means for introducing fluid pressure between the pistons, to move the members toward one another and resilient means threaded upon the guide rods between the blocks to separate the members.

4. In a welding gun, a pair of spaced supports, parallel guide rods extending between supports, a cylinder mounted on one of said supports, having an axis parallel with said rods, electrode carrying members slidably arranged on said guide rods, a pair of pistons in said cylinder, a sleeve connecting one of said pistons with one of said members and a piston rod extending thru said sleeve and said one of said pistons and connected to the other piston and other member, means on said sleeve for engaging the member having the cylinder from one side to limit the movement of the sleeve in one direction.

5. In a welding gun, a pair of spaced supports, parallel guide rods extending between supports, a cylinder mounted on one of said supports, having an axis parallel with said rods, electrode carrying members slidably arranged on said guide rods, a pair of pistons in said cylinder, a sleeve connecting one of said pistons with one of said members and a piston rod extending thru said sleeve and said one of said pistons and connected to the other piston and other member, said piston rod extending beyond the other side of said other piston and interacting means associated with said extending rod and other side of said cylinder member to limit the movement of the piston rod.

6. In a welding gun, a pair of spaced supports, parallel guide rods extending between supports, a cylinder mounted on one of said supports, having an axis parallel with said rods, electrode carrying members slidably arranged on said guide rods, a pair of pistons in said cylinder, a sleeve connecting one of said pistons with one of said members and a piston rod extending thru said sleeve and said one of said pistons and connected to the other piston and other member and conduit means for introducing fluid pressure into the space between the pistons, said conduit means comprising a bore thru the piston rod extension and piston rod to an outlet point between the pistons.

7. In a welding gun, a support, a cylinder mounted on said support, plural pistons movable in said cylinder, welding electrodes movable into operative engagement with each other, and piston elements each connecting one of said electrodes to one of said pistons, one of said pistons forming a guide for the piston element of the other piston.

8. In a welding gun, a support, a cylinder mounted on said support, plural pistons movable in said cylinder, welding electrodes movable into operative engagement with each other, and piston elements each connecting one of said electrodes to one of said pistons, one of said pistons being apertured to receive the piston element of the other piston, whereby the electrodes are movable into proximity with each other.

9. In a welding gun, a support, a cylinder mounted on said support, two pistons movably mounted in said cylinder, two welding electrodes, and two piston elements each connecting one of said electrodes to one of said pistons, each piston element extending from the same end of said cylinder.

10. In a welding gun, a support, a cylinder mounted on said support, a piston movably mounted in said cylinder, a piston rod secured to said piston and extending through one end of the cylinder, a second piston movably mounted adjacent said first piston and having an aperture therein through which the piston rod extends, a sleeve fastened to said second piston and enclosing said piston rod, and electrodes secured to said piston rod and sleeve.

11. In a welding gun, a support, a cylinder mounted on said support, plural pistons movable in said cylinder, welding electrodes movable into operative engagement with each other, piston elements each connecting one of said electrodes to one of said pistons, each of said piston elements forming a guide for the sliding movement of the other said electrodes for normally separating said electrodes.

WILLIAM A. WEIGHTMAN.